(12) United States Patent
Foley

(10) Patent No.: US 8,365,484 B2
(45) Date of Patent: Feb. 5, 2013

(54) CONNECTOR SYSTEM FOR SECURING AN END PORTION OF A STEEL STRUCTURAL MEMBER TO A VERTICAL CAST CONCRETE MEMBER

(75) Inventor: Robert P. Foley, Dayton, OH (US)

(73) Assignee: The Foley Group, LLC, Dayton, OH (US)

( * ) Notice: Subject to any disclaimer, the term of this patent is extended or adjusted under 35 U.S.C. 154(b) by 380 days.

(21) Appl. No.: 12/653,362

(22) Filed: Dec. 11, 2009

(65) Prior Publication Data
US 2011/0138735 A1    Jun. 16, 2011

(51) Int. Cl.
*E04B 1/34* (2006.01)
*E04B 1/38* (2006.01)
*E04B 5/00* (2006.01)
*E04B 7/00* (2006.01)

(52) U.S. Cl. ............. 52/289; 52/285.1; 52/702; 52/707; 52/73; 403/403

(58) Field of Classification Search ............ 52/251, 52/272, 283, 285.1, 289, 698, 700, 702, 704, 52/707, 73, 712; 403/403, 353
See application file for complete search history.

(56) References Cited

U.S. PATENT DOCUMENTS

| | | | | |
|---|---|---|---|---|
| 1,511,542 A | * | 10/1924 | Tomkinson | ............ 52/708 |
| 1,872,813 A | * | 8/1932 | Reiland | ............ 52/702 |
| 1,929,835 A | * | 10/1933 | Awbrey | ............ 52/709 |
| 3,513,610 A | * | 5/1970 | Devonport | ............ 52/283 |
| 4,782,635 A | * | 11/1988 | Hegle | ............ 52/126.4 |
| 4,951,438 A | | 8/1990 | Thoresen | |
| 5,548,939 A | * | 8/1996 | Carmical | ............ 52/707 |
| 5,881,519 A | | 3/1999 | Newkirk | |
| 6,298,630 B1 | | 10/2001 | VeRost et al. | |
| 6,494,639 B1 | | 12/2002 | Friend | |
| 6,739,099 B2 | * | 5/2004 | Takeuchi et al. | ............ 52/167.1 |
| 7,225,590 B1 | * | 6/2007 | diGirolamo et al. | ............ 52/379 |
| 2011/0107711 A1 | * | 5/2011 | Foley | ............ 52/655.1 |
| 2011/0107716 A1 | * | 5/2011 | Foley | ............ 52/699 |

* cited by examiner

*Primary Examiner* — Mark Wendell
*Assistant Examiner* — Ryan Kwiecinski
(74) *Attorney, Agent, or Firm* — Jacox, Meckstroth & Jenkins

(57) ABSTRACT

A steel structural member is secured to a vertical cast concrete member or wall by a connector system including a fabricated steel receiver embedded within the wall. Embedded anchors are attached to the receiver which has upper and lower front wall portions flush with the concrete wall and define a front opening. A support bracket has a horizontal plate attached to the beam and a vertical plate which fits through the front opening within the receiver. The bracket is attached to the beam which is then elevated, and the vertical plate is inserted through the opening into the receiver. The beam and vertical plate are then shifted downwardly until opposite upper and lower edge portions of the vertical plate are blocked by the front wall portions of the receiver. In the illustrated embodiment, the front opening and vertical plate are generally rectangular with the opening wider than the plate.

4 Claims, 2 Drawing Sheets

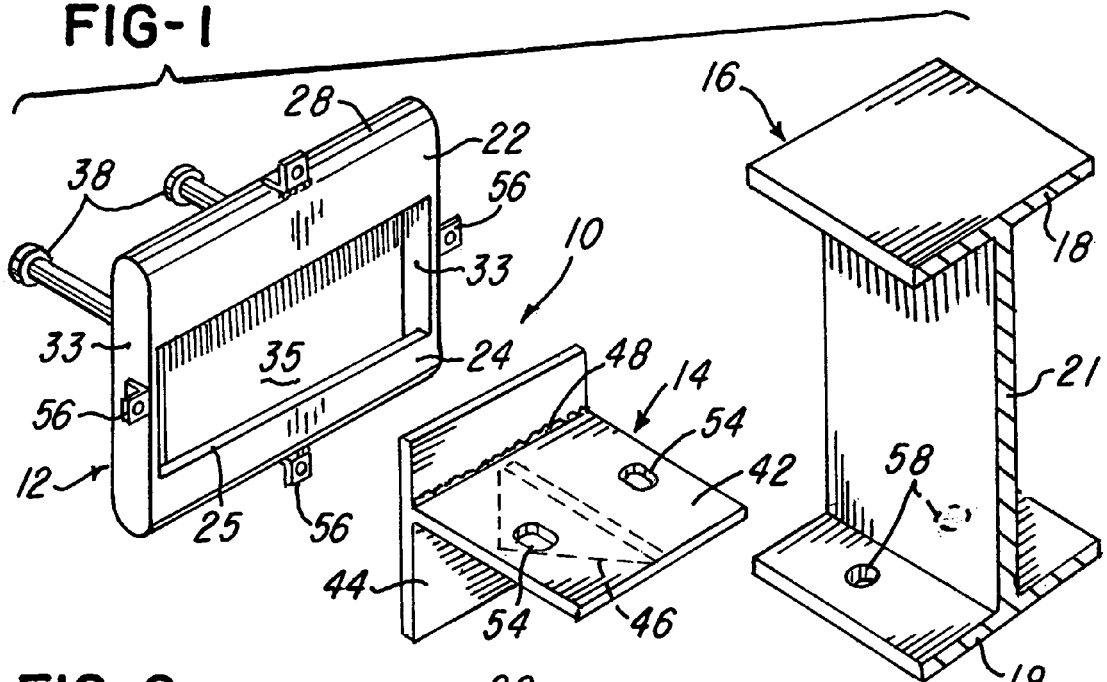
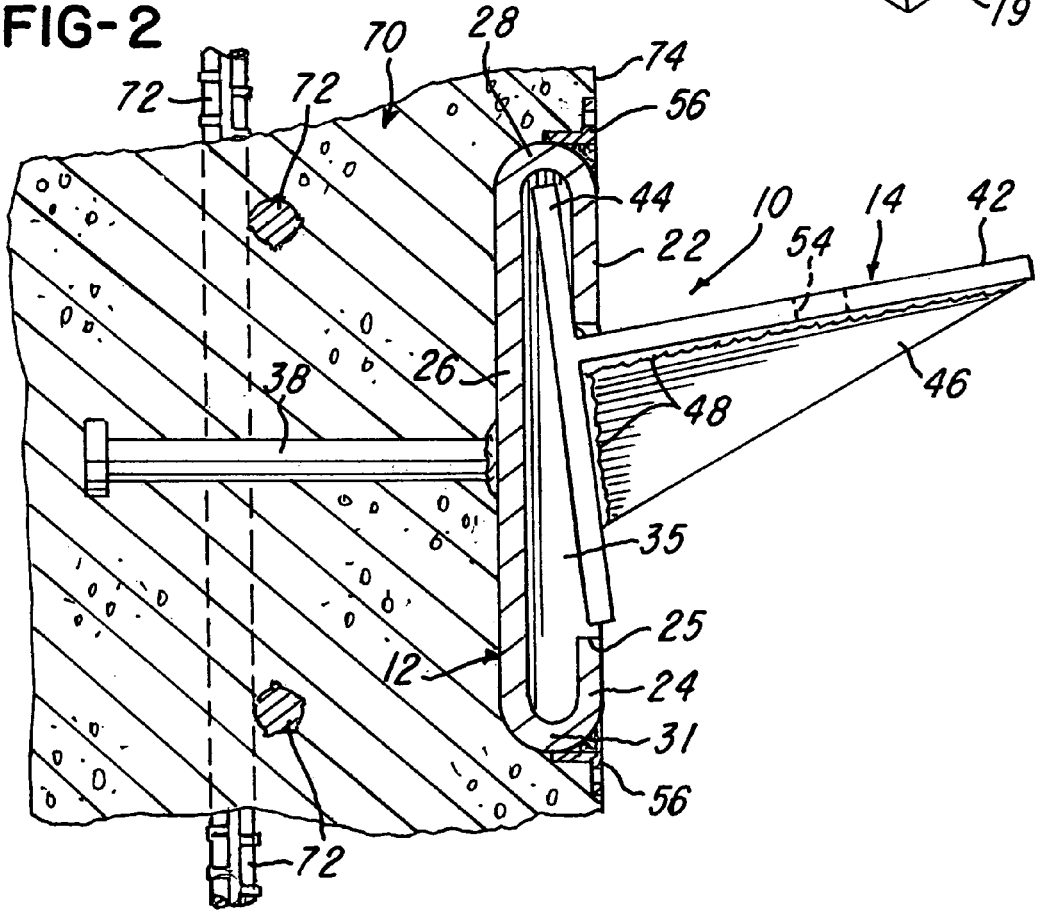

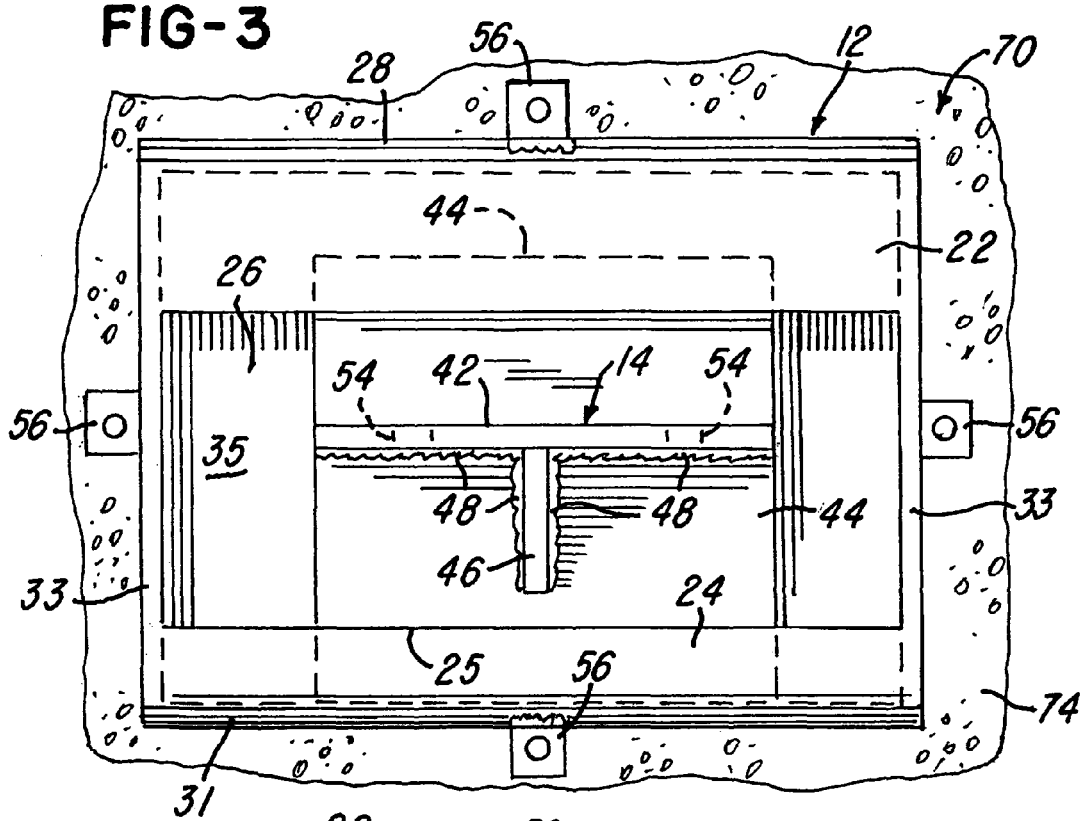
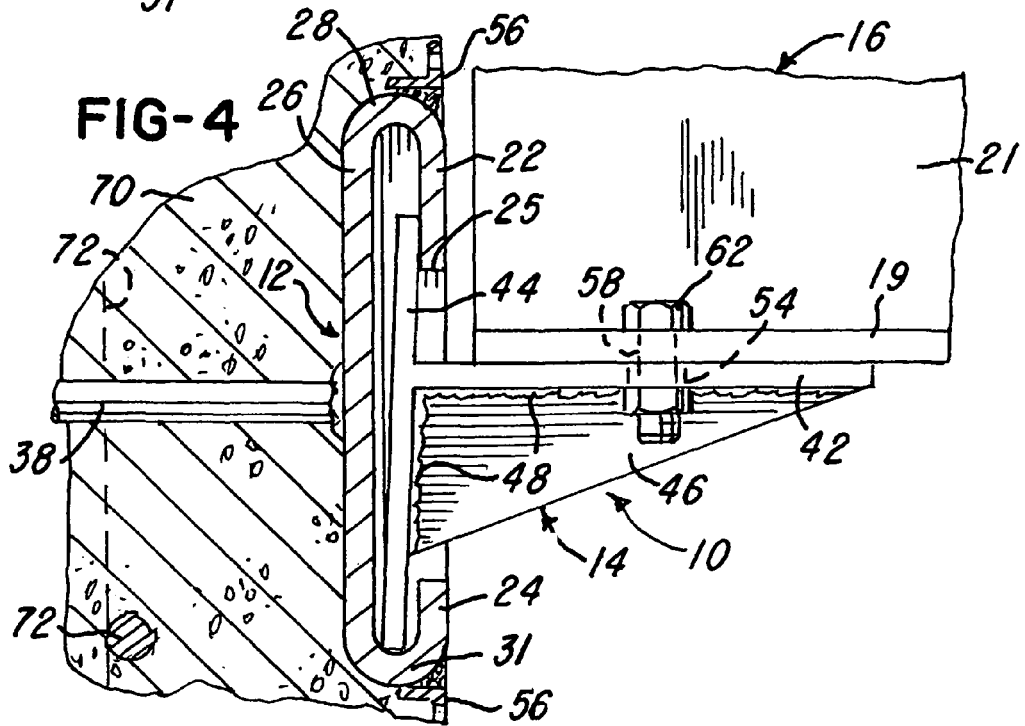

CONNECTOR SYSTEM FOR SECURING AN END PORTION OF A STEEL STRUCTURAL MEMBER TO A VERTICAL CAST CONCRETE MEMBER

BACKGROUND OF THE INVENTION

In the construction of a building or other structure, it is common to construct cast reinforced concrete walls by using tilt-up precast wall panels or panels precast at a remote plant or by casting concrete walls in place. After the vertical concrete walls are formed, it is common to connect structural steel members such as steel beams or steel truss joists to the concrete walls. Usually steel angle brackets are attached to the walls, for example, as disclosed in U.S. Pat. Nos. 5,881, 519, 6,298,630 and 6,739,099. Other forms of embedded connectors are disclosed, for example, in U.S. Pat. Nos. 4,951,438, 5,548,939 and 6,494,639. In the '639 Patent, a vertical plate is secured to a concrete wall surface by headed concrete anchors and defines keyhole slots for receiving headed studs or pins which project from an angle bracket.

The angle bracket is used to support an end portion of a beam and is also used to attach a wall panel to a concrete floor having an embedded plate with headed concrete anchors as shown in the patent. The use of the connectors disclosed in the above patents for securing an end portion of a beam or joist to a vertical concrete wall usually requires that a worker be located at the elevated site of the connector to attach the end portion of the beam to the angle bracket or to connect the angle bracket to a plate secured to the wall. This requires the worker to climb a ladder extending to the wall connector or to a scaffold adjacent the wall or use a hydraulic lift, all of which requires additional time and expense for connecting a beam or joist to a wall and sometimes places the worker in an unsafe situation.

SUMMARY OF THE INVENTION

The present invention is directed to an improved connector system for connecting an end portion of a structural steel member, such as a steel beam or truss joist, to a vertical structural concrete member, such as a reinforced concrete column or wall, during the erection of a building or other structure. In general, the connector system of the invention includes a fabricated steel receiver which is embedded in the concrete column or wall, and concrete anchors project from the receiver into the concrete. The receiver has front wall portions defining an opening and also defines a cavity behind the front wall portions. A support bracket includes a horizontal plate which is attached to an end portion of the structural steel member while the steel member is located at ground level. The support bracket also includes a vertical plate which is adapted to be inserted through the opening within the receiver and into the cavity after the structural member is elevated. The end portion of the structural member and the bracket are then lowered slightly until opposite edge portions of the vertical plate of the support bracket shift within the cavity to a position behind the opposing front wall portions of the receiver.

In the illustrated embodiment, the front opening within the receiver and the vertical plate of the support bracket are generally rectangular, and the support bracket and structural member are tilted upwardly slightly to insert the upper portion of the vertical plate into the cavity. The structural member and bracket are then returned to a horizontal position and lowered so that the vertical plate is captured behind the upper and lower front wall portions of the receiver. The connector system provides a number of advantages such as eliminating field welding during erection, avoiding the need for a worker to climb a ladder or use a hydraulic lift to a position adjacent the connector system, significantly reduces the time and cost for making a connection, provides a safe means for making a connection and simplifies the inspection and/or testing of the connection at the elevated site during erection.

Other features and advantages of the invention will be apparent from the following description, the accompanying drawings and the appended claims.

BRIEF DESCRIPTION OF THE DRAWINGS

FIG. 1 is a perspective exploded view of a connector system including a receiver and a bracket constructed in accordance with the invention and showing a fragmentary perspective view of a conventional steel structural member beam to be supported by the bracket;

FIG. 2 is a vertical section of the receiver and an elevation view of the bracket shown in FIG. 1 with the receiver embedded in a vertical concrete wall and with the support bracket in an insert position;

FIG. 3 is an elevational view showing the support bracket in its lowered locked position within the receiver; and FIG. 4 is a fragmentary vertical section similar to FIG. 2 and showing the beam and attached support bracket in their locked position with the receiver.

DESCRIPTION OF THE ILLUSTRATED EMBODIMENT

Referring to FIG. 1, a connector system 10 constructed in accordance with the invention includes a fabricated metal or steel receiver 12 and a T-shape support bracket 14. The bracket 14 is adapted to receive and support an end portion of an elongated structural steel member illustrated in the form of a steel H-beam 16. However, the structural steel member may also be a steel truss joist or any other member used to construct a building or similar structure. As shown, the H-beam 16 has an upper flange portion 18 and a lower flange portion 19 integrally connected by a vertical web portion 21. As used herein, it is to be understood that the term beam includes a steel truss joist or any other structural member.

The fabricated steel receiver 12 is illustrated in the form of a box and includes opposing upper and lower flat front wall portions 22 and 24 which define a rectangular opening 25 and are rigidly and integrally connected to a flat rear wall portion 26 by a curved top wall portion 28, a curved bottom wall portion 31 and opposite end wall portions 33. As shown in FIGS. 2 & 4, the front wall portions 22 & 24, the rear wall portion 26, the top wall portion 28 and the bottom wall portion 31 may be formed from a one-piece flat steel plate and welded to the end wall portions 33. All of the wall portions cooperate to define a chamber or cavity 35 behind the opening 25 and the front wall portions 22 & 24. A plurality of at least two headed concrete anchor studs 38 are welded to the inner or rear wall 26 for anchoring the receiver 12 in precast concrete or cast-in-place concrete, as described later. While the enclosed box-like receiver 12 prevents concrete from entering the chamber or cavity 35 during the casting of the concrete, some of the walls or part of the walls 26, 28, 31 and 33 may be reduced or omitted, and the anchors 38 welded to the front wall portions 22 & 24 or a portion of the rear wall 26, and a removable plastic foam block or pad may be temporarily used to define the cavity 35 behind the front wall portions 22 & 24 during casting of the concrete.

The support bracket 14 of the connector system 10 includes a horizontal support plate 42 and a generally vertical attachment plate 44 which are rigidly connected by a vertical gusset plate 46 and welds 48. As shown in FIGS. 2 & 4, the horizontal plate 42 forms a slight angle from 90° with the vertical plate 44. The horizontal plate 42 is welded to the vertical plate 44 below the top edge of the vertical plate for load distribution and for engaging the front wall portions 22 & 24. As shown in FIG. 1, the horizontal plate 42 has horizontally spaced elongated adjustment slots 54 which extend perpendicular to the vertical plate 44. As also shown in FIGS. 2 & 4, the vertical plate 44 has a vertical height greater than the vertical height of the opening 25 defined by the opposing upper and lower front wall portions 22 & 24 of the receiver 12. Also, the horizontal width of the bracket 14 is substantially less than the width of the opening 25. As shown in FIGS. 1 & 2, a set of angle mounting brackets 56 are welded to the top wall 56, bottom wall 31 and end walls 33 of the receiver 12 and have holes which receive nails or fasteners for attaching the receiver to concrete forms so that the front wall portions 22 and 24 of the receiver 12 are flush with the concrete surface after the forms are removed. The holes in the brackets 56 attached to the end walls 33 are in or adjacent a plane defined by the top surface of the bracket plate 42 to aid in positioning the receiver 12 on the forms.

In use of the connector system 10, an end portion of the structural steel member or beam 16 is provided with a pair of holes 58 (FIG. 1) within the bottom flange 19, and the holes 58 align with the slots 54 in the horizontal plate 42 of the bracket 14. While the beam 16 is located close to or supported by the ground or floor surface for a building, the bracket 14 is attached to the beam 16 by a pair of bolts 62 (FIG. 4) which extend through the holes 58 in the bottom flange 19 of the beam and the slots 54 within horizontal plate 42 of the bracket 14. The slots 54 provide for horizontal adjustment between the beam 16 and bracket 14.

After the receiver 12 is embedded in a cast concrete member or wall 70, which is commonly reinforced by one or more mats of crossing vertical and horizontal concrete reinforcing bars or rebars 72 (FIG. 2), the front surfaces of the front wall portions 22 & 24 of the receiver 12 are flush with the inner vertical surface 74 of the wall 70. As mentioned above, the receiver 12 may be attached to forms located at a remote precast concrete plant or may be attached to the forms for casting concrete walls or columns in place at the building site. The receiver 12 may also be positioned within the forms for precast tilt-up wall panels by supporting the receiver 12 above the horizontal floor used for casting the tilt-up panels and by connecting the receiver to an edge form for the panels.

After the support bracket 14 is attached to the end portion of a structural steel member or beam 16, the beam is elevated and tilted slightly by a crane, and the upper portion of the vertical plate 44 is inserted through the opening 25 (FIG. 2) defined by the opposing upper and lower front wall portions 22 & 24 of the receiver 12. The beam 16 and bracket 14 are then tilted downwardly until the lower portion of the vertical plate 44 enters the cavity 35 after which the beam and bracket are lowered slightly by the crane until the bottom surfaces of the vertical plate 44 rest upon the bottom wall portion 31 of the receiver. In this position of the bracket 14, the opposite upper and lower edge portions of the vertical plate 44 are located behind or in back of the corresponding opposing upper and lower front wall portions 22 & 24 of the receiver 12, as shown in FIG. 4. In this locked position, the bracket 14 and beam 16 are positively secured to the cast concrete member or wall 70 with the end surface of the beam 16 adjacent the inner vertical surface 74 of the wall 70 as shown in FIG. 4. The opposite end portion of the beam 16 is then secured to its supporting steel structure in a conventional manner.

From the drawings and the above description, it is apparent that a connector system constructed in accordance with the invention provides desirable features and advantages. As one advantage, the connector system 10 does not require any welding during erection of the building, and the welding required to construct the receiver 12 and the support bracket 14 may be efficiently performed, inspected and tested at a fabricating and welding plant, thereby eliminating the requirement for inspecting and testing connector welds during erection at the building site. The connector system also avoids the need for a worker to climb a ladder or be elevated to the receiver 12 on a vertical wall, thus providing for a faster, less expensive and safer means for connecting an end portion of a structural steel member to a concrete member such as a concrete wall or column. In addition, the rectangular opening 25 defined by the front wall portions 22 & 24 of the receiver 12 and the vertical plate 44 of the bracket 14, provide for an easy to use and quick connection of a beam to a concrete wall or column. The connection is also positive, high strength and reliable after the beam and support bracket 14 are shifted downwardly with the opposite upper and lower edge portions of the vertical plate 44 behind the opposing upper and lower front vertical wall portions 22 & 24 of the receiver 12, as shown in FIGS. 3 & 4. The elongated rectangular opening 25 also provides for horizontal or lateral shifting for field adjustment of the beam and the bracket 14.

While the form of connector system herein described constitutes a preferred embodiment of the invention, it is to be understood that the invention is not limited to this precise form of the invention, and that changes made therein without departing from the scope and spirit of the invention as defined in the appended claims.

What is claimed is:

1. A connector system adapted for supporting an end portion of a structural member by a vertical cast concrete member, said connector system comprising a metal receiver embedded in said concrete member and including an upper front wall portion spaced vertically above a lower front wall portion to form upper and lower front wall portions positioned substantially flush with a vertical surface of said concrete member and defining an opening between said upper and lower front wall portions, said receiver further including a rear wall portion spaced inwardly within said concrete member from said front wall portions and rigidly connected to said front wall portions, at least one anchor member rigidly connected to said receiver and embedded in said concrete member, a metal connecting bracket including a horizontally extending support plate rigidly connected to a substantially vertical attachment plate with said support plate adapted to be connected to the end portion of the structural member, said attachment plate adapted to be inserted through said opening into a cavity within said receiver between said rear wall portion and said front wall portions in response to tilting said bracket and moving an upper portion of said attachment plate through said opening into an upper portion of said cavity behind said upper front wall portion, said cavity and said opening providing for tilting said bracket and moving a lower portion of said attachment plate into said cavity and thereafter for shifting said attachment plate downwardly within said cavity, and said upper front wall portion and said lower front wall portion of said receiver overlap and block said upper portion and said lower portion of said attachment plate of said bracket in a locked position after said attachment plate is shifted downwardly within said cavity.

2. A connector system as defined in claim 1 wherein said rear wall portion of said receiver is integrally connected to said front wall portions of said receiver by a top wall portion and a bottom wall portion, and said attachment plate of said bracket engages said bottom wall portion of said receiver when said bracket is in said locked position.

3. A connector system as defined in claim 1 wherein said bracket includes a gusset plate rigidly connecting a bottom surface of said support plate to a front surface of said attachment plate, and said opening defined between said upper and lower front wall portions receives said gusset plate with said lower front wall portion disposed below said gusset plate.

4. A connector system as defined in claim 1 wherein said anchor member and a second said anchor member are rigidly secured to said rear wall portion of said receiver.

* * * * *